March 30, 1943.  C. VAN DEVENTER, 3D., ET AL  2,315,301
SHEAVES OR PULLEYS PARTICULARLY ADAPTED FOR LOOMS
Filed Oct. 25, 1940
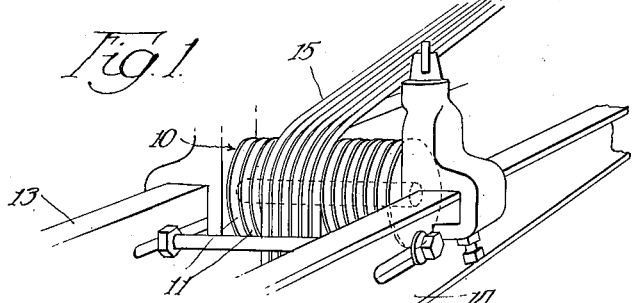
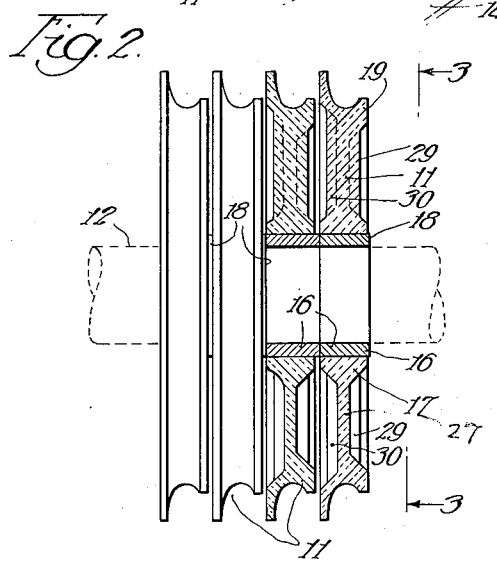
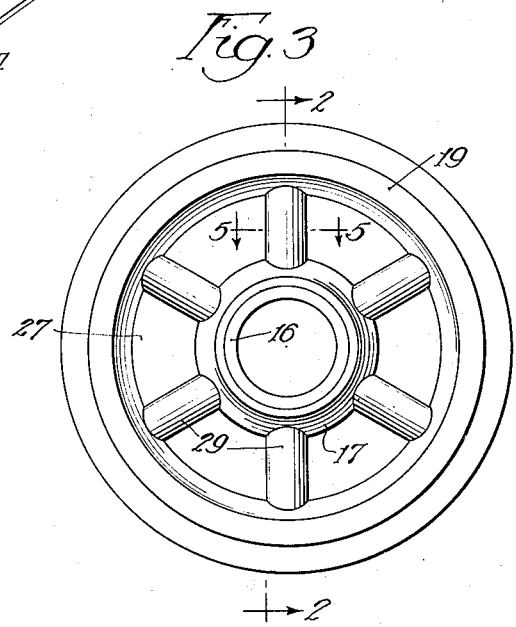
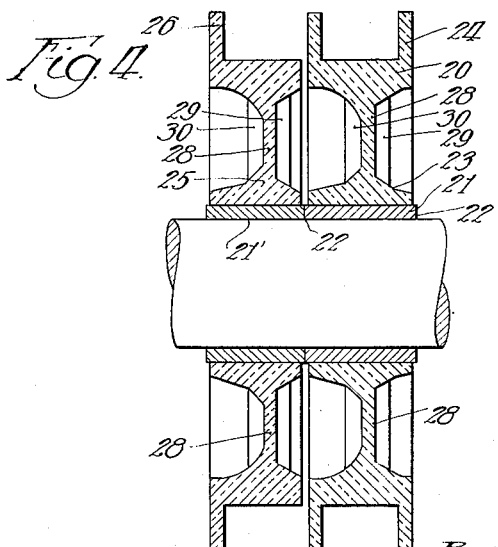
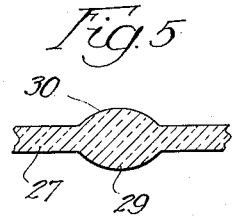
Inventors:
Christopher Van Deventer III
and John Deans Patented Mar. 30, 1943

2,315,301

UNITED STATES PATENT OFFICE 2,315,301

SHEAVE OR PULLEY, PARTICULARLY ADAPTED FOR LOOMS

Christopher Van Deventer, III, and John Deans, Knoxville, Tenn., assignors to National Plastics, Inc., Knoxville, Tenn., a corporation of Tennessee Application October 25, 1940, Serial No. 362,770

1 Claim. (Cl. 74—230.1)

The present invention relates to sheaves, pulleys and the like. It is particularly directed to certain novel improvements in sheaves that are used in looms. It is the principal purpose of the present invention to provide a novel sheave construction whereby the bearing member of the sheave is fixed in the body portion thereof so as to provide end bearings as well as axial bearings upon a shaft.

Where these sheaves are mounted on looms a multiplicity of them are mounted upon a shaft in juxtaposition to each other.

The sheaves have a forward and backward motion and usually there is a weight attached, the weight usually being about four pounds. Alternatively this tension may be supplied by a spring. It has been found that the forward and backward motion of the sheaves with the weights attached results in the sheaves or bearings heretofore used being worn into an oval shape. The sheave then cants or tips out of line, making the weave uneven. With the present construction this difficulty is essentially overcome.

Another and more particular purpose of the invention is to provide a novel method of forming sheaves, pulleys and the like with a bearing member of oil-carrying material. Throughout the following description the term "oil-carrying" is used as a general definition for bearing members that are impregnated or filled with oil. As an example of such bearing members we refer to the bearings sold under the trade name "Oilite."

The present invention contemplates the manufacture of sheaves and pulleys of suitable plastic material that is used for molding. Such plastic material includes synthetic resinous compounds such as phenol formaldehyde, furfural phenol, cresols, ureas, melamine, etc. The plastic binder is mixed with a filler consisting of ground cottonseed hulls and linters to provide a molding compound that can be directly molded into the sheave and pulley form in a well known manner and in any shape necessary.

It is also a purpose of the present invention to provide a novel sheave or pulley consisting of a plastic molding composition shrunk upon an oil-carrying bearing sleeve.

It is the further purpose of the invention to provide a sheave for use on looms in which the bearing part comprises an oil-carrying sleeve that will not drip but that will contain enough oil to be self-oiling and that will prevent the body of the sheave from coming in contact with the adjacent sheave thus eliminating any so-called dusting or splintering off from friction.

It is also a purpose of the invention to provide a sheave construction wherein a multiplicity of sheaves may be mounted on a shaft and in operation will cause air motion between the several sheaves thus keeping them cooler and further avoiding "dusting" and splintering off without the necessity of providing spacing elements or additional bearings between the several sheaves.

The novel features and advantages of the present invention will appear more fully as the description proceeds, reference being had to the accompanying drawing wherein a preferred form of the invention is shown. It is to be understood, however, that the drawing and description are illustrative only and are not to be taken as limiting the invention except insofar as it is limited by the claim.

Fig. 1 is a perspective view of a portion of a loom showing the sheaves, which form the subject matter of this invention, in their operative position;

Fig. 2 is an enlarged view partly in section taken substantially on the line 2—2 of Fig. 3;

Fig. 3 is an end elevational view looking at Fig. 2 from the direction indicated by the line 3—3;

Fig. 4 is a sectional view through a plurality of pulleys showing the manner in which they are constructed in accordance with the present invention; and Fig. 5 is an enlarged fragmentary sectional view taken on the line 5—5 of Fig. 3.

Referring now in detail to the drawing, the present invention is shown in its preferred form as embodied in a loom sheave assembly 10 wherein a plurality of sheaves 11 are rotatably journaled upon a common shaft 12 which is mounted between two frame members 13 and 14 of the loom. The sheaves are adapted to guide the flexible cords shown at 15. The sheaves 11 have an oscillating forward and backward motion in the operation of the loom and there is a weight of about four pounds attached to the cords 15. Heretofore, insofar as we are aware, these sheaves have been made of wood and/or metal. The forward and backward motion with the weights attached tends to wear the bearing in the sheave into an oval shape and when this wearing has proceeded to any appreciable degree the individual sheave begins to cant or tip out of line in one direction or another, thus making the sheave uneven and interfering with the operation of the other adjacent sheaves.

Our invention comprises a sheave assembly wherein the several sheaves 11 are each provided with an oil-carrying bearing sleeve 16, the sleeves 16 being preferably of a metal impregnated with oil such as the well known "Oilite" bearing so that they will not drip oil but will provide sufficient oil for lubrication purposes. These sleeves are so mounted in the sheaves 11 as to provide bearings on the shaft 12 and to provide end bearings between the respective sheaves. This last feature is accomplished by projecting the ends of the sleeves 16 slightly beyond the hubs 17 of the sheaves 11 as indicated at 18 in Fig. 2. The hub 17 and the rim 19 of the sheaves 11 are of substantially the same axial thickness so that the extended portions 18 of the sleeves 16 serve to slightly space these sheaves at their peripheries as well as at the hubs. This construction provides oil end bearings between the several sheaves so that the sheaves may be stacked tightly together and yet be free to turn with respect to each other without tilting. As wear takes place there are two surfaces at right angles to each other acting as bearings to prevent the tilting of the sheaves. These surfaces are the end bearings between the respective sleeves and the bearings of the other sleeves on the shaft.

The sheave construction, although adaptable for loom sheaves, is not limited thereto. Fig. 4 shows the application of the same construction to a pulley. In this case a pulley 20 is provided with a sleeve 21, the ends 22 of which project slightly beyond the hub 23 of the pulley. The hub 23 and the rim portion 24 of the pulley are of substantially the same axial thickness. A pulley such as pulley 20 may be combined with a second pulley 25 which has only one belt confining flange 26 but which otherwise is substantially of the same construction as the pulley 20. The sleeve 21 of the pulley 20 and the corresponding sleeve 21' of the pulley 25 maintain the proper spacing of the two pulleys and provide non-dripping, oil-carrying bearings for the pulleys.

The pulleys and sheaves are so constructed as to take advantage of the slight spacing provided by the sleeve bearings to aid in cooling the pulleys and sheaves. For this purpose the web portion 27 of the sheaves 11 and the web portion 28 of the pulleys 20 and 25 are provided with circumferentially spaced ribs 29 and 30 which act to stir the air and circulate it between the pulleys or sheaves thus maintaining a continuous circulation of air which will aid in cooling the parts.

The present invention contemplates also a novel sheave and pulley construction wherein the hub, web and rim portion of the pulley or sheave is made from a suitable binder substance and a filler of cottonseed hulls and linters. The filler material, comprising cottonseed hulls and linters, is combined with a suitable binder such as a synthetic resinous compound or other material which is capable of binding the cottonseed hulls and linters into a solid form. Some of the materials that we have found useful as binders are phenol formaldehyde, furfural phenol, cresols, ureas and melamine compounds. It is possible of course to use as a binder any suitable substance of either a thermo-setting or thermo-plastic type.

In the manufacture of the sheaves and pulleys the composition body consisting of the binder and the cottonseed hulls and linters is preferably first molded and before it has cooled entirely the molded article (sheave or pulley) is placed on a jig and the oil-carrying bearing is forced into the hub a distance so that the ends of the bearing protrude on each side of the hub as indicated at 18 in Fig. 2 and at 22 in Fig. 4. The plastic article is then cooled rapidly, causing it to shrink around the bearing sleeve and clamp it tightly in place. The rapid cooling may be done either by air or liquid but it should be done as quickly as possible so as to avoid loss of oil due to excessive heat. The oil in the oil-carrying sleeve is preferably of the type that is fairly resistant to heat so that it will not volatilize and be driven out of the bearing by the heat imparted thereto in mounting the bearing in the molded sheave or pulley.

There are of course other ways in which the oil-carrying bearing sleeve may be inserted in the molded plastic sheave or pulley. For example, a number of sheaves may be molded and cooled and then reheated in order to insert the oil-carrying bearing. The rapid cooling of the unit will still have to take place. The bearing may also be cold pressed into the hub of the sheave. Where the temperature in molding is not excessive with respect to the temperature which the oil will take in the oil-carrying sleeve the plastic compound may be molded directly around the bearing sleeve.

The foregoing examples are merely to illustrate possibilities. The preferred and successful method however is to first mold the article and then while it is still hot insert the sleeve and shrink the molded article on the sleeve by rapid cooling.

It is believed that the nature and advantages of the present invention will be readily apparent to those skilled in this art from the foregoing description. Some of the particular advantages of the present invention as a loom sheave assembly will now be set forth.

The mounting of the oil-carrying bearings as a replaceable sleeve in the hub of the plastic composition accomplishes several results. An important result is that there is no dripping of oil and yet the bearing surfaces on the shaft and between the several sheaves are oiled. The extension of the bearing sleeve beyond the sheave hub creates a space between the sheaves, thus preventing the sheaves from contacting each other and eliminating dusting from friction. The spacing of the sheaves provides a cooling area between the sheaves, and the spokes keep the air in the space between the sheaves in motion thus helping to cool the sheaves and to keep them clean from the lint settlement in the mill.

Since the bearing sleeves may be accurately formed before inserting in the sheave, the sheaves may be grouped in a loom assembly to accurately fit within an over-all tolerance.

Furthermore, the molded plastic and cottonseed hull body of the sheave or pulley does not absorb the oil from the oil-carrying bearing and in this manner the entire oil content of the bearing is preserved for oiling the bearing surfaces.

Having thus described our invention, what we claim as new and desire to secure by Letters Patent is:

A loom sheave assembly comprising a multiplicity of spaced sheaves, a shaft on which said sheaves are mounted to turn independently of each other, said sheaves having hubs spaced from each other, and oil carrying bearing sleeves fixed in said hubs and projecting beyond them, said sleeves having end bearing portions abutting each other whereby the sleeves hold the sheaves in spaced parallel relation and prevent contact of one sheave with another.

CHRISTOPHER VAN DEVENTER, III.
JOHN DEANS.